Feb. 17, 1970 R. C. ENTENMANN 3,496,407
TRANSISTORIZED DEFLECTION AMPLIFIER WITH SUPPRESSION OF HIGH FREQUENCY COMMON MODE SIGNALS
Filed Aug. 2, 1967
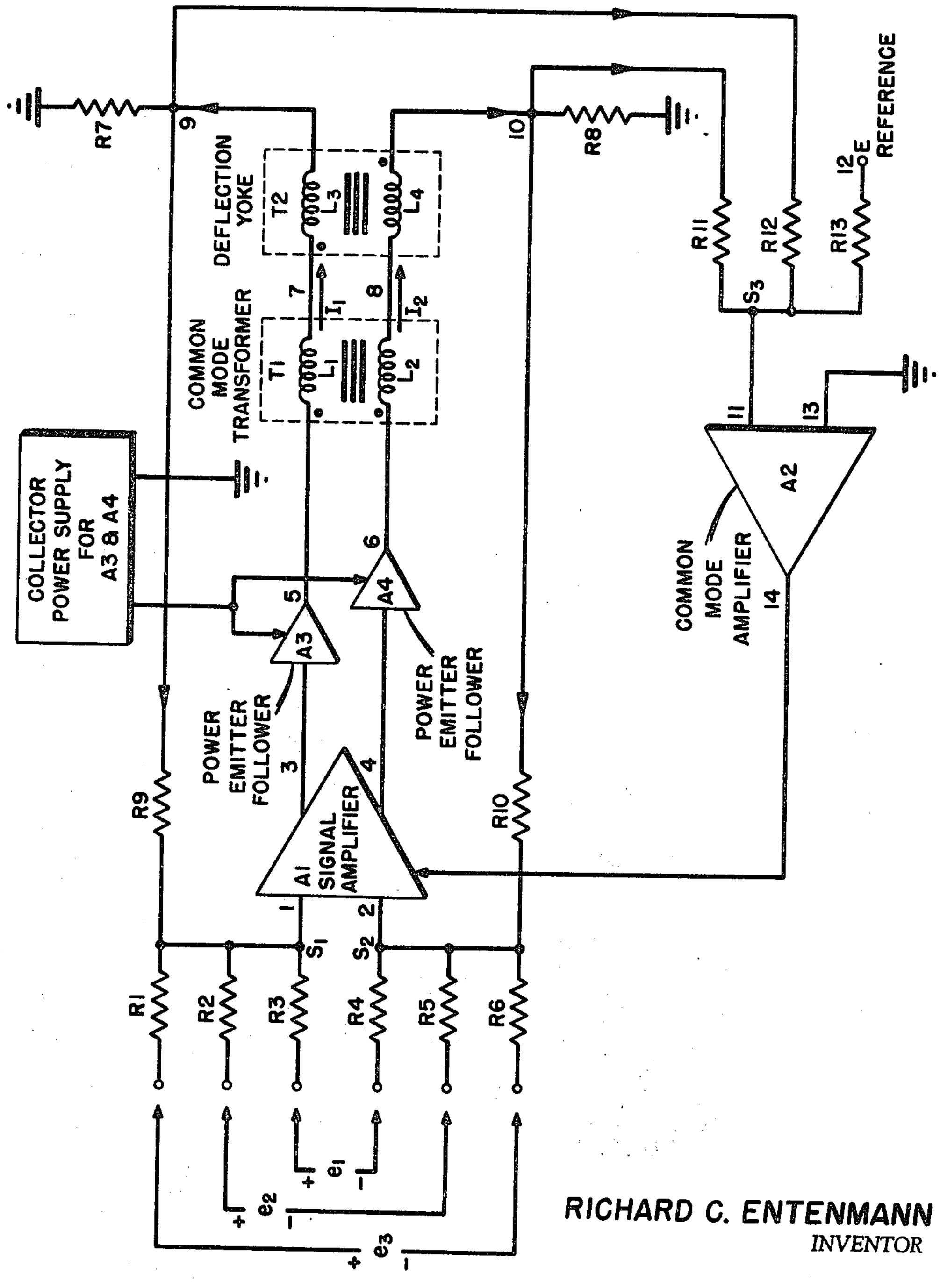
RICHARD C. ENTENMANN
*INVENTOR*
BY *Craig & Antonelli*
ATTORNEYS 3,496,407

TRANSISTORIZED DEFLECTION AMPLIFIER WITH SUPPRESSION OF HIGH FREQUENCY COMMON MODE SIGNALS

Richard Carl Entenmann, San Diego, Calif., assignor to Stromberg-Carlson Corporation, Rochester, N.Y., a corporation of Delaware Filed Aug. 2, 1967, Ser. No. 657,973
Int. Cl. H01j *29/70;* H03f *1/00*
U.S. Cl. 315—27 25 Claims

ABSTRACT OF THE DISCLOSURE

This application discloses a transistorized deflection amplifier connected to a push-pull deflection yoke with a common mode transformer connected between the output stages of the differential signal amplifier and the input to the push-pull deflection yoke to eliminate high frequency common mode currents therein. There is also provided a control circuit connecting a sample voltage proportional to the current in the deflection yoke through a common mode amplifier to the control circuit of the signal amplifier for summing low frequency and DC common mode signals and for applying the resultant signal to the signal amplifier to stabilize only the common mode signal passed through the signal amplifier.

The present invention relates in general to common mode rejection systems and more particularly to such a system for use in connection with cathode ray tube push-pull deflection systems.

In push-pull magnetic deflection systems, the desired deflection control signal can be distinguished from spurious and other undesirable non-control signals since many of the latter signals are of like polarity, whereas push-pull control signals are of unlike polarity. The spurious common mode signals often superimposed upon differential deflection signals in cathode ray tube deflection control circuits are undesirable due to their detrimental effect upon deflection control, and therefore, efforts have been made to eliminate such components from the deflection signals.

A common mode rejection circuit has been proposed wherein the phase inverter is inserted into one line of a pair of input control lines, which are in turn connected to a resistance bridge circuit so that like polarity input signals are made to cancel each other in the bridge circuit, whereas unlike polarity input signals are reproduced at the output of the circuit. The disadvantage inherent in this type of common mode rejection circuit is the need for further active elements in the control system to effect the phase reversal of one of the input signals thereto. This results in an increased power drain in the system. In addition, for common mode signals of low frequency or of zero frequency, the known common mode rejection circuit has proven to be very inefficient.

In accordance with the present invention there is provided in conjunction with a differential amplifier for control of a push-pull deflection yoke, means for suppressing the high frequency common mode signals superimposed upon the differential control deflection signals. This means may be in the form of a common mode transformer connected between the output stages of the signal amplifier and the input to the push-pull deflection yoke. In addition, the feedback signals which are returned from the deflection yoke's current sampling resistors to the input of the signal amplifier are also summed and nulled with a reference voltage at the input of the common mode amplifier, the output of which is applied in control of the signal amplifier in such a way as to affect only the common mode output voltage, leaving the differential output voltage unchanged. In this way, the common mode current in the yoke is held constant at all times and is directly proportional to the value of reference voltage applied to the input of the common mode amplifier.

It is an object of the present invention to provide an amplifier for push-pull cathode ray deflection systems in which common mode signals are automatically eliminated or suitably controlled to eliminate objectionable effects upon the deflection control signal.

It is another object of the present invention to provide relatively simple and economical means for accurately controlling differential deflection signals through use of common mode rejection techniques.

It is a further object of the present invention to provide an amplifier for cathode ray deflection control signals which eliminates, or otherwise materially reduces, the disadvantageous effects inherent in known systems of a similar nature.

It is another object of the present invention to reduce or eliminate common mode transient components of the feedback signals in push-pull cathode ray tube deflection amplifiers thereby to prevent saturation and cutoff of the input stages of the amplifiers.

These and other objects, features and advantages of the present invention will become more apparent from the following detailed description thereof, when taken in conjunction with the accompanying drawing, wherein the sole figure represents a schematic circuit diagram of an exemplary embodiment of the present invention.

Referring now more particularly to the drawing, the respective polarities of input deflection signal voltages $e_1$, $e_2$ and $e_3$, are applied to respective summing junctions $S_1$ and $S_2$ at inputs 1 and 2 of signal amplifier $A_1$ via resistances $R_1$ through $R_6$. The amplifier $A_1$ is a DC differential amplifier, preferably a transistorized differential amplifier, of any conventional configuration capable of providing differential output signals on lines 3 and 4. The differential output from amplifier $A_1$ is applied respectively to a pair of power emitter followers $A_3$ and $A_4$ having outputs 5 and 6, respectively, connected to a common mode transformer $T_1$. The common mode transformer $T_1$ is provided with a pair of tightly coupled windings $L_1$ and $L_2$ connected respectively to the lines 5 and 6 from the power emitter followers $A_3$ and $A_4$. As is well known, tightly or closely coupled coils usually have a coefficient of coupling of 0.5 or greater. The transformer $T_1$ is designed to provide a very low AC and DC iimpedance to the normal differential voltage components of the deflection control signals applied thereto, but provides a very high impedance to the relatively high frequency common mode voltage components which may form a part of the deflection control signals. More particularly, the windings $L_1$ and $L_2$ of the transformer are wound in the same sense, as indicated by the conventional symbols indicated in the drawing, and the inductance of winding $L_1$ is equal to the inductance of winding $L_2$.

The output leads 7 and 8 from the common mode transformer $T_1$ are connected directly to the deflection yoke $T_2$ having at least one pair of deflection windings per deflection axis, which is represented in this embodiment as $L_3$ and $L_4$. In accordance with the present invention, the common mode transformer $T_1$ is designed so that the inductance of windings $L_1$ and $L_2$ of the transformer have at least an approximately equal or greater inductance than the corresponding windings $L_3$ and $L_4$ in the deflection yoke, with this inductance being less than eight times the inductance of the deflection yoke. The windings $L_3$ and $L_4$ in the deflection yoke $T_2$ are designed to have equal inductance, but are conventionally wound in the opposite sense, as clearly illustrated by standard symbols in the drawing. The terminals 9 and 10 of the deflection yoke are connected through respective current sampling resistances $R_7$ and $R_8$ to ground. The sample voltages at the ungrounded ends of $R_7$ and $R_8$ are connected via feedback resistances $R_9$ and $R_{10}$ to the summing points $S_1$ and $S_2$, respectively, at the inputs to the $A_1$ signal amplifier.

The sample voltages from $R_7$ and $R_8$ are also connected through resistances $R_{11}$ and $R_{12}$ to a summing point $S_3$ to which is also connected a reference voltage E via terminal 12 and resistance $R_{13}$. The summing point $S_3$ is connected via input 11 to a common mode differential amplifier $A_2$.

Voltages at 9 and 10 are resolved into a net common mode voltage which is nulled against the fixed reference voltage at points $S_3$. The common mode amplifier $A_2$ has its second input 13 connected to ground, and use is made of only a single output thereof so that the differential amplifier is used as a single-ended input to a single-ended output device, also known as a cathode-coupled amplifier or emitter coupled amplifier, which does not invert the signal, as does the single tube or single transistor amplifier. The output 14 from the amplifier $A_2$ is connected in control of signal amplifier $A_1$ in such a manner that the common mode voltage and not the differential voltage in the amplifier $A_1$ is controlled in accordance with the output of the amplifier $A_2$.

In the specific embodiment now described, the connection from 14 to the side of the $A_1$ amplifier symbol indicates that the common mode feedback signal is introduced into $A_1$ at some point beyond the input terminals 1 and 2. Since the amplifier $A_1$ is a differential amplifier, the gain of its input stage with respect to common mode signals is very low, typically much less than unity. It should be understood that the input stage has a limited range of common mode signal voltages over which this low gain is realized, typically about five volts. The common mode feedback signal from 14 therefore is injected into the second stage of the amplifier $A_1$ or into the control electrode which determines the common mode output voltage of the first stage.

In operation of the present invention, the differential signal amplifier $A_1$ sums the input voltages $e_1$, $e_2$ and $e_3$ and nulls the sum against the feedback voltages from 9 and 10, thereby yielding error voltages at the summing junctions $S_1$ and $S_2$ thereof. The differential error voltage is amplified by the amplifier $A_1$ and delivered to the power emitter followers $A_3$ and $A_4$, which in turn amplify the error voltage and apply it to the common mode transformer $T_1$. The voltages at points 5 and 6 at the output of the emitter followers $A_3$ and $A_4$ can be resolved into two components: a push-pull or differential component, and an average or common mode component. The AC or DC differential voltage components of the deflection control signals are virtually unchanged by the common mode transformer $T_1$ since the transformer offers a very low impedance to these signals. At the output leads 7 and 8 from the transformer $T_1$ the differential voltage component gives rise to differential current signals $I_1$ and $I_2$ in the deflection yoke $T_2$, which differential yoke currents create the magnetic field required for electron beam deflection.

The currents $I_1$ and $I_2$ pass through the resistances $R_7$ and $R_8$ from the output points 9 and 10 from the deflection yoke $T_2$ creating a yoke current sample voltage or feedback voltage at the points 9 and 10. These feedback voltages are delivered to the summing junctions of the amplifier $A_1$ by way of resistances $R_9$ and $R_{10}$ and serve to close the signal loop of the signal amplifier $A_1$ so that the differential sum of the currents $I_1$ and $I_2$ are related directly to the sum of the input signal voltages due to the feedback action.

Common mode signal may be introduced into the amplifier $A_1$ from several sources. If one of the input signals $e_1$, $e_2$, or $e_3$ is single ended rather than a balanced push-pull signal, it has the effect of a push-pull or differential signal component superimposed on a common mode signal component. If equal transient noise voltages are induced in both the plus and minus leads of an input signal pair, the noise is a common mode signal. If the transformer $T_1$ of this invention is not used, a large and significant common mode signal is produced by the feedback action of the closed loop system when square wave or step function inputs are applied to the deflection system. In this case, the currents in the yoke coils cannot immediately respond to the abruptly changed input signal because of coil inductance, and the feedback sample voltages at 9 and 10 momentarily fail to null the input signals. The resulting transient error signals at 1 and 2 are generally not equal and opposite, since emitter followers $A_3$ and $A_4$ have dissimilar characteristics when responding to positive going steps on the one hand, and to negative going steps on the other hand. Thereby a large common mode transient signal appears at 1 and 2 if the transformer $T_1$ is not used.

In the embodiment of the figure, the high frequency common mode voltage components which form part of the deflection control signals and which are in a frequency range extending above a frequency equivalent to the transient response time of the deflection yoke and appear at points 5 and 6 at the output of the power emitter followers $A_3$ and $A_4$ will not readily pass through the common mode transformer $T_1$ to the deflection yoke $T_2$ and the sampling resistors $R_7$ and $R_8$ because the common mode transformer provides a high impedance to this signal. However, the DC and low frequency common mode voltage components which appear at points 5 and 6 at the output of the power emitter followers $A_3$ and $A_4$ do readily pass to points 7 and 8 at the output of the common mode transformer because the inductive impedance of the transformer has only a small effect on the relatively low frequency, or zero frequency, components of the common mode voltage. The common mode voltage components which pass the common mode transformer $T_1$ create a common mode yoke current coponent in the deflection yoke $T_2$ giving rise to low frequency common mode feedback voltages at the output points 9 and 10 from the deflection yoke. Voltages at points 9 and 10 on the one hand are fed back through resistances $R_9$ and $R_{10}$, respectively, to the summing points $S_1$ and $S_2$ at the input of signal amplifier $A_1$. The common mode component in these signals is not effective in reducing the common mode output signals by feedback action, however, since the input stage of $A_1$ generally has low common mode gain. On the other hand, these components at points 9 and 10 are applied to summing point $S_3$ via resistances $R_{11}$ and $R_{12}$ where they are summed or resolved into a net common mode voltage and nulled against a fixed reference voltage E applied via resistance $R_{13}$ to the summing point $S_3$.

The resulting signal in the summing point $S_3$ is applied to input 11 of the common mode amplifier $A_2$ and this common mode error voltage is amplified in the amplifier $A_2$ and subsequently delivered via output 14 of the amplifier to the control portion of signal amplifier $A_1$ in such a manner that the common mode voltage component fed back to the input of the signal amplifier $A_1$ is stabilized to a constant value without in any way affecting the differential voltage component of the deflection signal. It is, of course, necessary that the band width of the amplifier $A_2$ be lower than that of amplifier $A_1$ to insure system stability. Thus, a common mode current in the deflection yoke $T_2$ is held constant at all times and is directly proportional to the value of the reference voltage E applied to the input of the common mode amplifier $A_2$.

The advantages of the present invention can be readily determined from the following example. With the common mode transformer $T_1$ omitted from the deflection amplifier, since the deflection yoke $T_2$ offers only a very small common mode impedance, even very small amplitude high frequency common mode signal voltages at points 7 and 8 would drive very high common mode currents into the deflection yoke $T_2$ and through the resistances $R_7$ and $R_8$. This would, in turn, require excessive current and power to be drawn from the collector voltage power supply for the power emitter followers $A_3$ and $A_4$. High common mode currents through the resistances $R_7$ and $R_8$ yield high common mode voltages at the summing junctions $S_1$ and $S_2$ of the signal amplifier $A_1$, which would result in driving the amplifier into saturation or cutoff and effecting opening of the signal feedback loop of the amplifier.

Practical values for the common mode transformer $T_1$ are as follows:

Winding $L_1$=40 microhenries
Winding $L_2$=40 microhenries
Mutual inductance M=39.75 microhenries
Common mode inductance $$\frac{(L_1+M)}{2}=39.875$$

microhenries
Differential inductance $(L_1+L_2-2M)=0.5$ microhenry

Practical values for the deflection yoke $T_2$ are as follows:

$L_3$=20 microhenries
$L_4$=20 microhenries
Mutual inductance M=19.5 microhenries
Common mode inductance $$\frac{L_3-M}{2}=0.25$$

microhenries
Differential inductance=$L_3+L_4+2M$=79 microhenries
$R_7$, $R_8$=0.2 ohm
$R_1$ through $R_6$=2.5K
$R_9$, $R_{10}$=1.25K
$R_{11}$, $R_{12}$=250 ohm
$R_{13}$=1.75K
E reference=12v. DC
Collector voltage for $A_3$ and $A_4$=40v. DC at 9 amps DC
Differential gains of $A_1$ and $A_2$ greater than 1000

It is apparent from the above example that the addition of the common mode transformer $T_1$ to the deflection amplifier circuit raises the common mode impedance load of the power emitter followers $A_3$ and $A_4$ from .25 microhenry to 40 microhenries while increasing the differential impedance from 79 microhenries to only 79.5 microhenries. It has been found in practice that the high frequency common mode voltages appearing at points 5 and 6 are in the order of 1/40 of the magnitude of the differential voltages at these points. In actual experimentation, the maximum differential voltage at 5 and 6 is approximately 80 volts for the above given example, and the maximum common mode voltage occurring at these points is approximately 2 volts. Thus, the peak common mode current drawn from the power supply for $A_3$ and $A_4$, and the common mode current into the sampling resistors $R_7$ and $R_8$ is about 1/160 of the peak current in the absence of $T_1$.

In summary, the use of a common mode transformer between the semi-conductor high power output stages and the push-pull deflection yoke automatically reduces the high frequency common mode currents in the deflection yoke thereby reducing the power drain in the output stages and effectively eliminating "lock up" in the input stages of the signal amplifier $A_1$. In addition, the control provided via common mode amplifier $A_2$ back to the signal amplifier $A_1$ effectively neutralizes the relatively low frequency common mode components of the deflection signals so that these common mode components in the yoke are held constant at all times.

While I have shown and described one exemplary embodiment in accordance with the present invention, it is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

I claim:

1. In a deflection system for cathode ray tubes a deflection yoke having a pair of deflection windings and amplifier means for applying differential deflection control signals to said deflection windings, the improvement consisting of means connected directly between said amplifier means and said deflection windings for suppressing high frequency common mode signals in a frequency range extending above a frequency equivalent to the transient response time of said deflection windings received from said amplifier means.

2. In a deflection system for cathode ray tubes a deflection yoke having a pair of deflection windings and amplifier means for applying differential deflection control signals to said deflection windings, the improvement consisting of means connected between said amplifier means and said deflection windings for suppressing high frequency common mode signals in a frequency range extending above a frequency equivalent to the transient response time of said deflection windings received from said amplifier means, wherein said common mode suppressing means consists of a common mode transformer including first and second windings each having a self-inductance of the order of the self-inductance of said deflection windings connected to respective ones of said deflection windings.

3. The combination defined in claim 2, wherein said first and second windings of said common mode transformer have equal inductance.

4. The combination defined in claim 1, further including control means connected to said amplifier means in control thereof for holding the relatively low frequency common mode signals passing therethrough to a constant.

5. The combination defined in claim 4, wherein said control means includes voltage feedback means connecting the output of said deflection windings to the input of said amplifier means.

6. In a deflection system for cathode ray tubes a deflection yoke having a pair of deflection windings and amplifier means for applying differential deflection control signals to said deflection windings, the improvement consisting of means connected between said amplifier means and said deflection windings for suppressing high frequency common mode signals in a requency range extending above a frequency equivalent to the transient response time of said deflection windings received from said amplifier means, further including control means connected to said amplifier means in control thereof for holding the relatively low frequency common mode signals passing therethrough to a constant, wherein said control means includes voltage feedback means connectig the output of said deflection windings to the input of said amplifier means, wherein said control means further includes means for summing the differential output of said deflection windings against a reference voltage including additional amplifier means responsive to said summed differential output for controlling said amplifier means to stabilize the relatively low frequency common mode signals therethrough.

7. The combination defined in claim 1, wherein said first amplifier is a DC differential amplifier.

8. A cathode ray tube deflection control system comprising a first differential amplifier having a pair of inputs and a pair of outputs, at least one source of deflection control signals connected to the inputs of said first differential amplifier, a cathode ray tube deflection yoke having a pair of windings connected to the respective outputs of said first differential amplifier, voltage feedback means sampling the currents through said deflection yoke and returning differential sample signals proportional to the currents to the input of said first amplifier, and common mode suppression means connected directly between said first amplifier and said deflection yoke for suppressing high frequency common mode signals in a frequency range extending above a frequency equivalent to the transient response time of said yoke applied thereto by said first amplifier.

9. The combination defined in claim 8, wherein said common mode suppression means consists of a common mode transformer having first and second windings connected to respective ones of said deflection windings.

10. The combination defined in claim 9, wherein said first and second windings of said common mode transformer have equal inductance.

11. The combination defined in claim 10, further including first and second power emitter followers connected between the respective outputs of said first differential amplifier and the respective windings of said common mode transformer.

12. A cathode ray tube deflection control system comprising a first differential amplifier having a pair of inputs and a pair of outputs, at least one source of deflection control signals connected to the inputs of said first differential amplifier, a cathode ray tube deflection yoke having a pair of windings connected to the respective outputs of said first differential amplifier, voltage feedback means sampling the currents through said deflection yoke and returning differential sample signals proportional to the currents to the input of said first amplifier, and common mode suppression means connected between said first amplifier and said deflection yoke for suppressing high frequency common mode signals in a frequency range extending above a frequency equivalent to the transient response time of said yoke applied thereto by said first amplifier, wherein said common mode suppression means consists of a common mode transformer having first and second windings connected to respective ones of said deflection windings, further including control means connected to the output of said voltage feedback means and to said first differential amplifier for holding the relatively low frequency common mode signals passing therethrough to a constant.

13. The combination defined in claim 12, wherein said control means includes means for summing said differential sample signals of said deflection windings against a reference voltage including second amplifier means responsive to said summed differential signals for controlling said first differential amplifier means to stabilize the relatively low frequency common mode signals therethrough.

14. The combination defined in claim 13, wherein said second amplifier is a differential amplifier.

15. A cathode ray tube deflection control system comprising a first differential amplifier having a pair of inputs and a pair of outputs, at least one source of deflection control signals connected to the inputs of said first differential amplifier, a cathode ray tube deflection yoke having a pair of windings connected to the respective outputs of said first differential amplifier, voltage feedback means sampling the currents through said deflection yoke and returning differential sample signals proportional to the currents to the input of said first amplifier, and common mode suppression means connected between said first amplifier and said deflection yoke for suppressing high frequency common mode signals in a frequency range extending above a frequency equivalent to the transient response time of said yoke applied thereto by said first amplifier, wherein the deflection windings have equal inductance which is of the order of magnitude of the inductance of the respective windings of said common mode transformer.

16. The combination defined in claim 13, further including first and second power emitter followers connected between the respective outputs of said first differential amplifier and the respective windings of said common mode transformer.

17. In a deflection system for a cathode ray tube including a deflection yoke having at least one pair of deflection windings per axis and differential amplifier means for applying deflection control signal to said deflection windings, the improvement consisting of impedance means connected directly between said amplifier means and said deflection windings for substantially attenuating high frequency, common mode signals in a frequency range extending above a frequency equivalent to the transient response time of said yoke received by said windings from said amplifier means without substantial attenuation of differential signals.

18. The combination defined in claim 17, wherein said impedance means is a common mode transformer having first and second windings connected respectively in series with respective windings of said deflection yoke operative on one axis of the cathode ray tube.

19. The combination defined in claim 18, wherein the common mode transformer has two tightly coupled windings of substantially equal self-inductance and said series connection is such that the induced voltages at the respective terminals of said first winding and said second winding connected to said amplifier means are of the same instantaneous polarity with respect to the terminals of said first and second windings connected to said deflection windings.

20. The combination defined in claim 19 further including a pair of sampling impedances connected respectively in series with said deflection windings and between said deflection windings and a reference potential, thereby to produce sample voltages proportional to the currents in said deflection windings, and control means to sum the sample voltages of said axis of deflection thereby to obtain a common mode feedback signal to control the low frequency common mode output signals of said differential amplifier means.

21. The combination defined in claim 20 wherein said control means is a D-C coupled amplifier, and said first and second windings each have a self-inductance greater than one-fourth but less than eight times the self inductance of each said deflection winding.

22. A deflection system or a cathode ray tube comprising a deflection yoke having at least one pair of deflection windings per axis each with respective first and second terminals, differential amplifier means for applying deflection control signals to said first terminals of said deflection windings, a pair of sampling impedances connected respectively in series with said deflection windings and between said second terminals and a reference potential, and the improvement consisting of impedance means series connected with said deflection windings and said sampling impedances whereby high frequency common mode signals in a frequency range extending above a frequency equivalent to the transient response time of said yoke applied to said sampling impedances by said amplifier means are substantially attenuated without substantial attenuation of differential signals.

23. The deflection system of claim 22 wherein said impedance means is a common mode transformer having first and second windings of substantially equal inductance tightly coupled, said series connection is such that the respective induced transformer voltages at the terminals of said first winding and said second winding connected to said deflection windings are of the same instantaneous polarity with respect to the terminals of said first and second windings connected to said sampling impedances.

24. The deflection system of claim 23 wherein the sampling impedances produce sample voltages proportional to the currents respectively therein, and further including control means to algebraically sum the sample voltages of one axis of deflection, thereby to obtain a common mode feedback signal to control the low frequency common mode output signals of said differential amplifier means.

25. The deflection system of claim 24, wherein the control means is a D-C coupled amplifier and the inductance of each of said first and second windings is more than one-fourth but less than eight times the inductance of each said deflection winding.

References Cited

UNITED STATES PATENTS 3,092,753 6/1963 Steiger ............. 315—27

RODNEY D. BENNETT, Primary Examiner

JOSEPH G. BAXTER, Assistant Examiner

U.S. Cl. X.R.

330—69; 333—77